(12) United States Patent
Chau (10) Patent No.: US 8,730,556 B2
(45) Date of Patent: May 20, 2014

(54) IN-BAND SIGNALING IN OPTICAL CROSS-CONNECT SWITCH USING AMPLITUDE MODULATION

(71) Applicant: Kelvin Chau, Pleasanton, CA (US)

(72) Inventor: Kelvin Chau, Pleasanton, CA (US)

(73) Assignee: Glimmerglass Networks, Inc., Hayward, CA (US)

( * ) Notice: Subject to any disclaimer, the term of this patent is extended or adjusted under 35 U.S.C. 154(b) by 0 days.

(21) Appl. No.: 13/626,788

(22) Filed: Sep. 25, 2012

(65) Prior Publication Data

US 2013/0107347 A1    May 2, 2013

Related U.S. Application Data

(60) Provisional application No. 61/554,302, filed on Nov. 1, 2011.

(51) Int. Cl.
*G02B 26/00* (2006.01)

(52) U.S. Cl.
USPC .......................................... 359/290; 359/291

(58) Field of Classification Search
USPC ..................... 359/290–298; 385/18
See application file for complete search history.

(56) References Cited

U.S. PATENT DOCUMENTS

| | | | | |
|---|---|---|---|---|
| 6,539,142 | B2 * | 3/2003 | Lemoff et al. | 385/18 |
| 6,707,594 | B2 * | 3/2004 | Holmes | 359/291 |
| 6,757,093 | B2 * | 6/2004 | Wood et al. | 359/291 |
| 2003/0076604 | A1 * | 4/2003 | Hagood et al. | 359/822 |

* cited by examiner

*Primary Examiner* — Mohammed Hasan
(74) *Attorney, Agent, or Firm* — Kilpatrick Townsend & Stockton LLP; Kenneth R. Allen (57) ABSTRACT

Signals employed to align and cause dithering via MEMS mirrors in an optical cross connect switch are manipulated to impose, on the optical beam (steered via the MEMS mirrors) amplitude modulation and in particular a time-varying set of induced mirror angles that yield a desired time history of optical power level that is modulated according to a digital code in the amplitude modulation pattern. The controlled time sequence expressed as a time-varying optical power level can be used for in-band signaling along the same optical channels available for conventional optical data. The amplitude modulated signal is conveyed through the cross connect switch and is useful for example in control and command of the cross connect switch.

6 Claims, 9 Drawing Sheets

IN-BAND SIGNALING IN OPTICAL CROSS-CONNECT SWITCH USING AMPLITUDE MODULATION

CROSS-REFERENCES TO RELATED APPLICATIONS

The present application claims benefit under 35 USC 119(e) of U.S. provisional Application No. 61/554,302, filed on Nov. 1, 2011, entitled "IN-BAND SIGNALING IN AN OPTICAL CROSS-CONNECT SWITCH," the content of which is incorporated herein by reference in its entirety.

BACKGROUND OF THE INVENTION

The invention relates to in-band signaling, and in particular to all-optical cross-connect (OXC) switches providing an in-band signaling capability. Such a switch is often called a transparent OXC because the signals are kept in the optical format. The invention finds application to micro-electromechanical systems (MEMS), but it is not so limited.

The all-optical cross-connect switch promises to become a key element of fiber-optic networks. Steering elements in the optical switch are used to direct beams of light from input fibers to the desired output fibers. The amount of optical power coupled through a given connection is a function of a) the amount of power present in the input fiber, b) insertion losses at the fibers, lenses, and steering elements such as mirrors, c) coupling loss due to mode radii mismatches and longitudinal errors, and d) coupling loss due to errors in beam alignment as effected by the steering elements.

Previous optical switches have not capitalized on the loss due to errors in beam alignment as a means of intentionally modulating the optical power emerging from the output fibers en route to certain other elements of optical network. A fraction of signal power can be utilized to generate a set of commands that instruct the actions of other device elements downstream along the optical path. This command set can be optically encoded as a sequence of events expressed by different optical power levels or discrete frequencies or the combinations. Such in-band signals travel along the same optical channels available for data. One example usage is to embed a command into the optical data channel so the receiving optical switch can use the command to determine what optical connection should be made for the incoming data. Another example is to use the command as a key to decipher the incoming data. In an all-optical network employing optical switches in conjunction with power-level-sensitive elements such as optical amplifier and multi-wavelength systems, the signaling function currently executed using dedicated elements could potentially be absorbed by the optical switch, thereby minimizing or eliminating potentially the need for expensive post-switch signaling sources.

In-band signaling techniques can be implemented with a single mirror actuated with at least one actuator used as a beam-steering element, with the power loss being governed by the mirror deflecting angle in at least one axis away from a set of angles that maximize coupling.

In the prior art such as found in U.S. Pat. Nos. 6,711,340; 6,484,114 and 6,556,285 of the assignee of the present invention Glimmerglass Networks, Inc., techniques were disclosed for optical beam alignment of MEMS based cross-connect switches and the like using a constant amplitude dithering technique. The subject matter of those patents is incorporated by reference herein for all purposes. Although the power-loss mechanism is similar to the loss mechanism employed in the present context, the prior art is not applicable to the general case of using two or more steering elements, or to the specific case of an in-operation optical switch utilizing prescribed motions of the steering elements that prohibit the methods of the prior patents. What is needed is a technique for optical modulation that can be effected using the steering elements of an in-operation optical switch without deleterious impact on the switching functions.

SUMMARY

According to the invention, in a multiple-axis free-space-coupled single-mode fiber-optic transmission system, such as an optical cross-connect switch, a method and apparatus are provided for the closed loop attenuation of optical beam power signals employed to align and cause dithering via MEMS mirrors which are manipulated to impose, on the optical beam amplitude modulation and in particular a time-varying set of induced mirror angles that yield a desired time history of optical power level that is modulated according to a digital code in the amplitude modulation pattern. The controlled time sequence expressed as a time-varying optical power level can be used for in-band signaling along the same optical channels available for conventional optical data. The amplitude modulated signal is conveyed through the cross connect switch and is useful for example in control and command of the cross connect switch.

In a specific embodiment involving two tip-tilt mirrors to couple optical power from an input fiber to an output fiber, the four mirror axes are actuated in such a way as to produce a time-varying set of induced mirror angles that yield a desired time history of optical power level. The controlled time sequence is expressed as a time-varying optical power level or discrete frequencies or their combinations and can be used for in-band signaling. Such continuous or burst signals travel along the same optical channels available for data conveyed through the fibers.

Since the attenuation technique is concerned with the DC level of measured power, the technique can be used simultaneously with compatible alignment-detection techniques that ignore the DC component and infer optical alignment through observation of signals at the frequencies of induced motions (dithers). The theoretical basis as presented here for four-axis variable attenuation is sufficient for the general case. Therefore, the disclosure is to be understood to address the cases for applications of more or fewer than four axes with a plurality of steering elements in the optical path.

The invention will be better understood by reference to the following detailed description in connection with the accompanying drawings.

DETAILED DESCRIPTION OF THE INVENTION

Free-Space Coupled Fiber Optic Switch Using MEMS

Figure 1:
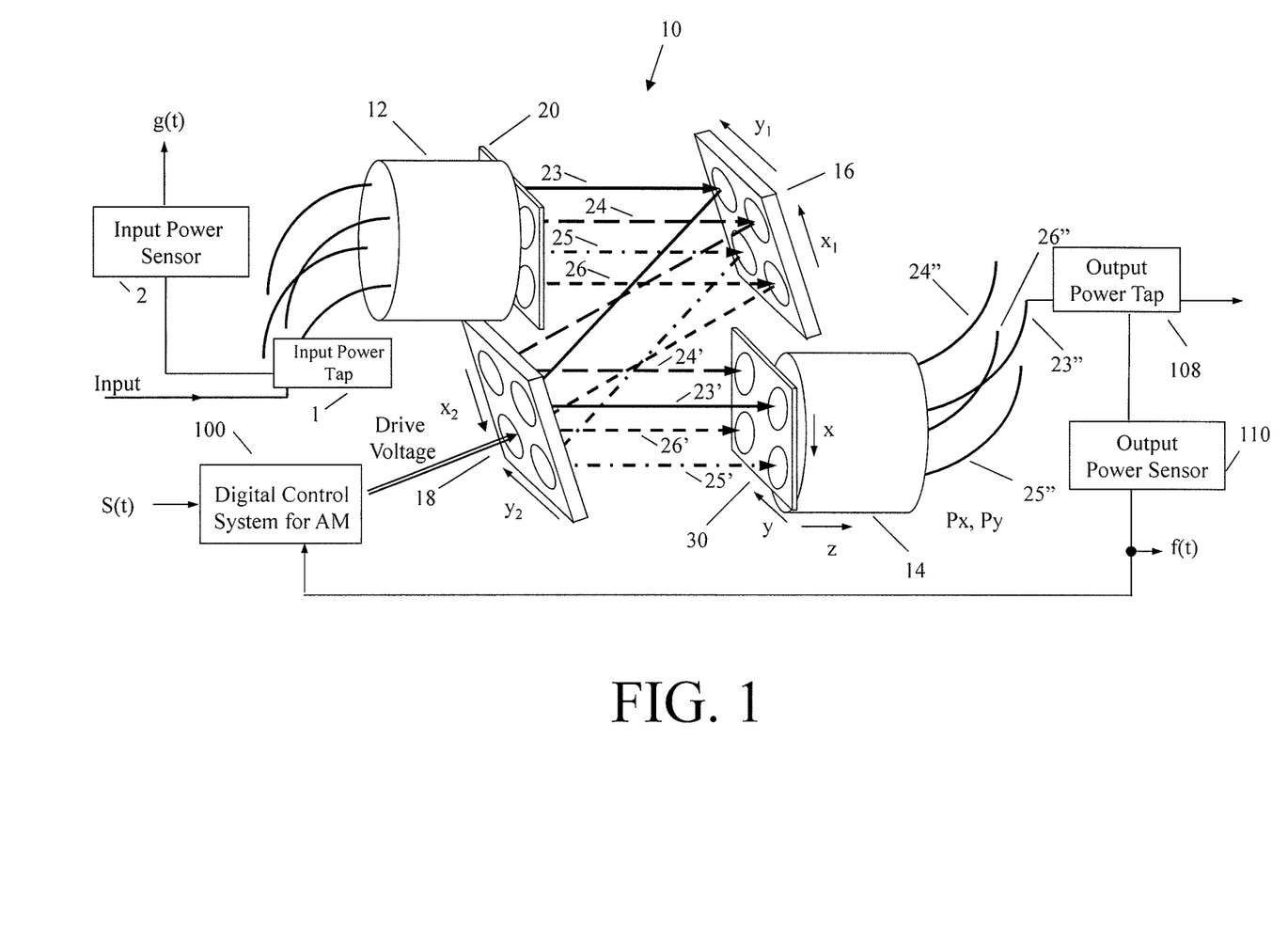
FIG. 1 is a perspective view of a three-dimensional optical switch showing a four port MEMS mirror array in which the invention is implemented, with a general schematic of an external controller and detection circuit for one channel.

Referring to FIG. 1, there is shown an example of a four-port MEMS mirror array fiber-optic cross-connect switch 10 in which the present invention may be implemented. The function of the fiber-optic switch 10 is to produce desired free-space couplings between the input fibers, in a first fiber array 12, and output fibers, in a second fiber array 14, via two-axis steering mirrors on a first mirror array 16 and a second mirror array 18. In the embodiment illustrating the invention, the optical path is unidirectional between input fibers and output fibers. Laser beams emanating from the input fiber array 12 are substantially collimated using a first lens array 20 confronting the first fiber array 12. Mirrors on the first or input mirror array 16 steer the collimated beams 23-26 from the first lens array 20 toward the appropriate mirrors on the second or output mirror array 18. The mirrors on the output mirror array 18 steer their incident beams 23-26 into the corresponding lenses on a second or output lens array 30. The output lenses of the second lens array 30 produce converging beams necessary for coupling power into the output fibers 23-26 of the second fiber array 14. FIG. 1 shows input power tap 1 and sensor 2 and output power tap 108 and sensor 100. They are utilized to detect the optical power at each input and output fibers. Input power sensor is used to extract the in-band signals, g(t), off the optical data channel from the network system upstream. The signal, g(t), is used to affect the local system for specific actions. Output power sensor is used to interpret the alignment errors in order to supply continuous adjustment to the control voltages of both input and output mirrors. In FIG. 1, S(t) is expressed as an in-band signal generated locally and is intended for the system downstream. The digital control system 100 in FIG. 1 receives S(t) that affects the movement of a selected mirror in the second MEMS array 18 in x and y, while still providing to the selected mirror in array 18 a steering signal to select an output position at the lens array 30 independently. The power signal, f(t), extracted at the output can be shown as amplitude modulated signals that originated as S(t), as hereinafter further explained.

Output Beam Alignment Geometry

Figure 2:
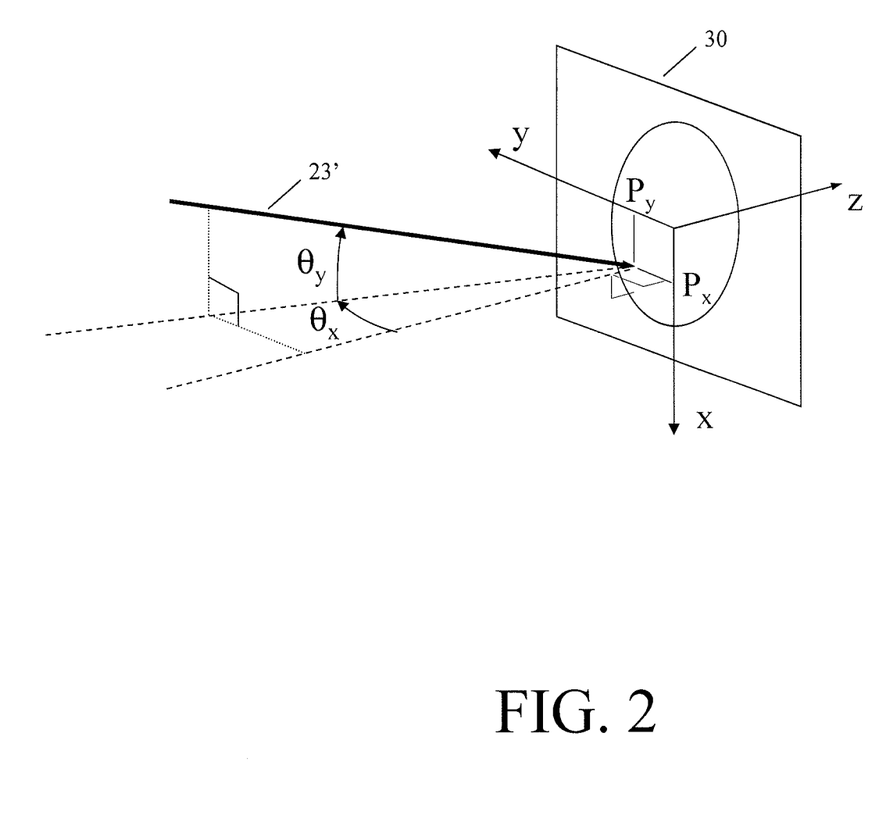
FIG. 2 is a schematic of a beam impinging on an output lens to illustrate beam alignment errors as used in the present invention.

Referring to FIG. 2, there is shown a diagram defining the alignment of an output beam relative to its output lens/fiber port in accordance with the invention. This technique may be applied in a variety of geometries, only one of which is that of FIG. 1. The axes "x", "y", and "z" define an "output" frame. The axis z is defined as the optical axis of the particular lens/fiber port (which may vary across the array of lens/fiber ports), and the perpendicular axes x and y are in the plane perpendicular to z. The beam intersects the output x-y plane at the linear displacements $P_x$ and $P_y$ in x and y, respectively. The two angles $\theta_x$ and $\theta_y$ define the orientation of the beam in the output x-y-z frame. With $\theta_x$ and $\theta_y$ equal to zero, the beam is parallel to the z axis. $\theta_x$ and $\theta_y$ are the rotations of the beam in the x and y directions, respectively, where a small-angle approximation (valid for the purpose of analyzing optical coupling) eliminates the need to define the order of the rotations. To clarify the sense of the rotations, the small-angle approximation for the unit vector in the direction of the beam expressed in the output frame is given by:

$$U_{beam}^{out} = [\theta_y, -\theta_x, 1].$$

Gaussian Power Coupling

Assuming that longitudinal misalignments are zero and that the beam is matched to the mode field radius of the output fiber, the total coupled power $P_{out}$ (a scalar quantity measured at the output fiber) can be approximated in a Gaussian form in terms of an input power $P_{in}$ and four normalized beam alignment errors:

$$P_{out} = P_{in} e^{-(\alpha^2 + \beta^2 + \rho^2 + \sigma^2)}, \quad (1)$$

where $P_{in}$ is the optical power before loss due to alignment errors, and the four normalized errors $\alpha$, $\beta$, $\rho$, and $\sigma$ are given by:

$$\alpha = \frac{f}{\omega_0}\theta_x, \ \beta = \frac{f}{\omega_0}\theta_y, \ \rho = \frac{n_{gap}\pi\omega_0}{\lambda f}(P_x - f\theta_y) \text{ and}$$

$$\sigma = \frac{n_{gap}\pi\omega_0}{\lambda f}(P_y + f\theta_x),$$

where:
f is the lens focal length,
$w_0$ is the beam radius at $1/e^2$ power density,
$\lambda$ is the laser wavelength, and
$n_{gap}$ is the index of refraction of the medium in the lens/fiber gap.

Constant-Power Dithering

Figure 3:
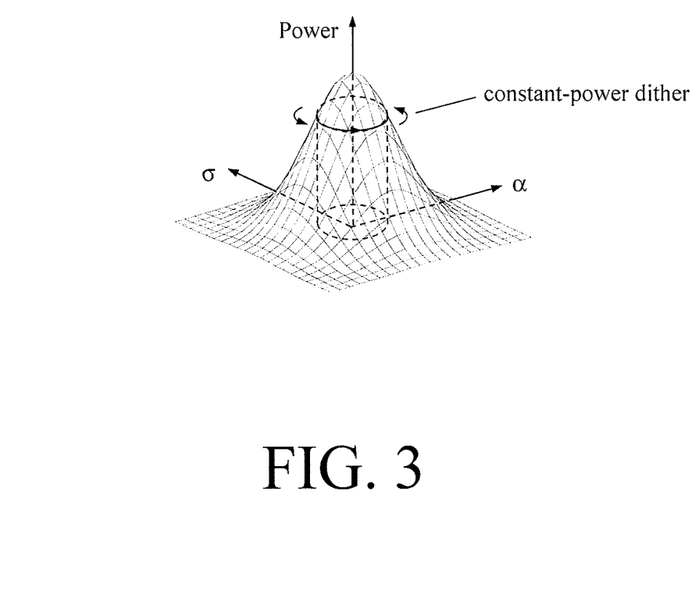
FIG. 3 is a three dimensional graph illustrating constant power dithering.

In the case of a MEMS fiber-optic switch for which the coupled power is Gaussian in the four normalized alignment errors, quadrature (sine and cosine signals at a given frequency) dithering of the beam alignments produces a constant coupled power when the alignment errors (ignoring the dither component) are zero and the model parameters of the system are properly tuned. FIG. 3 illustrates for two of the four axes the concept of using quadrature dithering to provide a constant output power when the coupled power is Gaussian in the two alignment errors shown.

When the alignment errors (ignoring the dither component) are zero as in FIG. 3, the sine and cosine dithers at the given frequency, whether above or below the natural resonance of the device, produce a circular trajectory in the two alignment errors. Since the sum of the squares of these two alignment errors is constant (due to the sine and cosine dithering), the result, as dictated by Equation 1, is a constant attenuated coupled power even though the individual errors are changing. If the other two dithers are also in quadrature form, these dithers will contribute a second constant loss term, such that the overall attenuation level due to the four dithers is constant. By injecting known alignment errors controlled by the dithering amplitude, the output optical power level can be set within the restriction of the defined absolute output power level.

Variable Attenuation Law

According to the invention, the S(t) (FIG. 1) controls the coupled power by control of beam alignment relative to a nominal optical axis. There are various techniques whereby the coupled power can be attenuated. These include applying a DC offset to the beam steering mechanism consisting of a plurality of beam steering elements, as through one or more bias command signals. In addition these techniques include application of various types of multiple time varying signals that are selected to produce a constant power output. These include applying periodic signals to the beam steering mechanism which produce beam alignment characteristics that are complementary to one another, applying harmonically related signals which produce the desired constant attenuation, applying a pair of sinusoidal signals which produce beam alignment characteristics that are in phase quadrature, or applying pairs of sinusoidal signals which are paired to produce beam alignment characteristics in phase quadrature and which signals may or may not be at different frequencies. These last two techniques will be referred to as dithering-type techniques. Combinations of DC offset and various types of time-varying signals can also be employed to affect attenuation control. As explained hereinafter as an example of the application of these principles of attenuation by controlled misalignment, coupled power is readily controlled by scaling the amplitude of excitation signals injected into the plant. It should be understood that these techniques can be used in a control system with feedback to regulate attenuation level or in an open-loop system by application of excitation signals based on some off-line criteria.

An example follows for the case of a plant incorporating a lens/fiber coupling element for which the power coupling is Gaussian in a set of normalized alignment errors. As part of a control system, a set of dither references is multiplied by a scale factor (hereinafter called the dither amplitude) to form a set of dither signals that constitute commanded values for the normalized alignment errors. The dither amplitude is adjusted by a function hereinafter called an attenuation control law. An element of the control system transforms the set of dither signals into a set of actuator excitation signals intended to produce normalized alignment errors equal to the dither signals. Assuming that the optical system is otherwise aligned either actively or passively, increasing the dither amplitude increases optical power loss according to the Gaussian coupling law given by:

$$P = P_{in} e^{-A^2},$$

where A is defined as the dither amplitude that scales a set of reference dithers that produce 1/e coupling for unity A. An example set of such dither references that distributes the loss evenly among the four normalized errors is given by:

$$[\alpha_{ref} \quad \beta_{ref} \quad \rho_{ref} \quad \sigma_{ref}] = \frac{\sqrt{2}}{2}[1 \quad 1 \quad 1 \quad 1].$$

The logarithm of the power P is given by:

$$\log(P) = \log(P_{in}) - A^2.$$

For a commanded coupled power $P_{com}$, the estimated dither amplitude $A_{est}$ can be written as:

$$A_{est} = \sqrt{\log(P_{in}) - \log(P_{com})}.$$

To accommodate modeling errors and possible variations in $P_{in}$, this dither amplitude $A_{est}$ should be used only as an initial estimate for the actual value of A designated $A_{com}$ that is required to produce $P_{com}$. A feedback approach to be presented next based on detecting an error term $A - A_{com}$ is robust to modeling errors and variations in $P_{in}$.

A dither-amplitude error term $A - A_{com}$, can be formed as follows. The expression for log(P) can be repeated in terms of the commanded value $P_{com}$ and the associated amplitude $A_{com}$, and in terms of the measured value $P_{meas}$ and the associated amplitude A:

$$\log(P_{com}) = \log(P_{in}) - A^2_{com},$$

$$\log(P_{meas}) = \log(P_{in}) - A^2.$$

Subtracting the expression for $\log(P_{meas})$ from $\log(P_{com})$ removes the dependence on $P_{in}$:

$$\log(P_{com}) - \log(P_{meas}) = A^2 - A^2_{com}.$$

The difference of squares $A^2 - A^2_{com}$ can be factored as:

$$A^2 - A^2_{com} = (A - A_{com})(A + A_{com}).$$

Defining $A_{err}$ as the error between the present and commanded value of A:

$$A_{err} = A - A_{com},$$

the error $A_{err}$ can be expressed as:

$$A_{err} = \frac{\log(P_{com}) - \log(P_{meas})}{A + A_{com}}.$$

Since the commanded value $A_{com}$ in the expression for $A_{err}$ is unknown (which was the motivation for computing the error term $A_{err}$ in the first place), an approximation for the denominator term $(A + A_{com})$ is necessary. Assuming that the initial estimate $A_{est}$ is sufficiently close to the actual value $A_{com}$, and that the value of A was initialized at $A_{est}$, the expression for $A_{err}$ can be approximated according to the invention as:

$$A_{err} \cong \frac{\log(P_{com}) - \log(P_{meas})}{2A_{est}}.$$

The above approximation for the error in the dither amplitude can be used to correct the dither amplitude A. One approach for correcting the dither amplitude is to numerically integrate the instantaneous error estimate $A_{err}$ to provide a correction term $A_{corr}$ that can be subtracted from $A_{est}$ to yield A:

$$A_{corr}(0) = 0$$

$$A_{corr}(j) = A_{corr}(j-1) + G \, A_{err}(j)$$

$$A(j) = A_{est} - A_{corr}(j).$$

The convergence speed of A toward the ideal value $A_{com}$ is set by the integral gain G used to incrementally add $A_{err}$ to the existing value of $A_{corr}$. An excessive gain value will yield an unstable response. Assuming the use of a reasonable gain, the value of A will converge to a value $A_{com}$ that produces the commanded coupled power $P_{com}$.

Attenuation Control System

Figure 4:
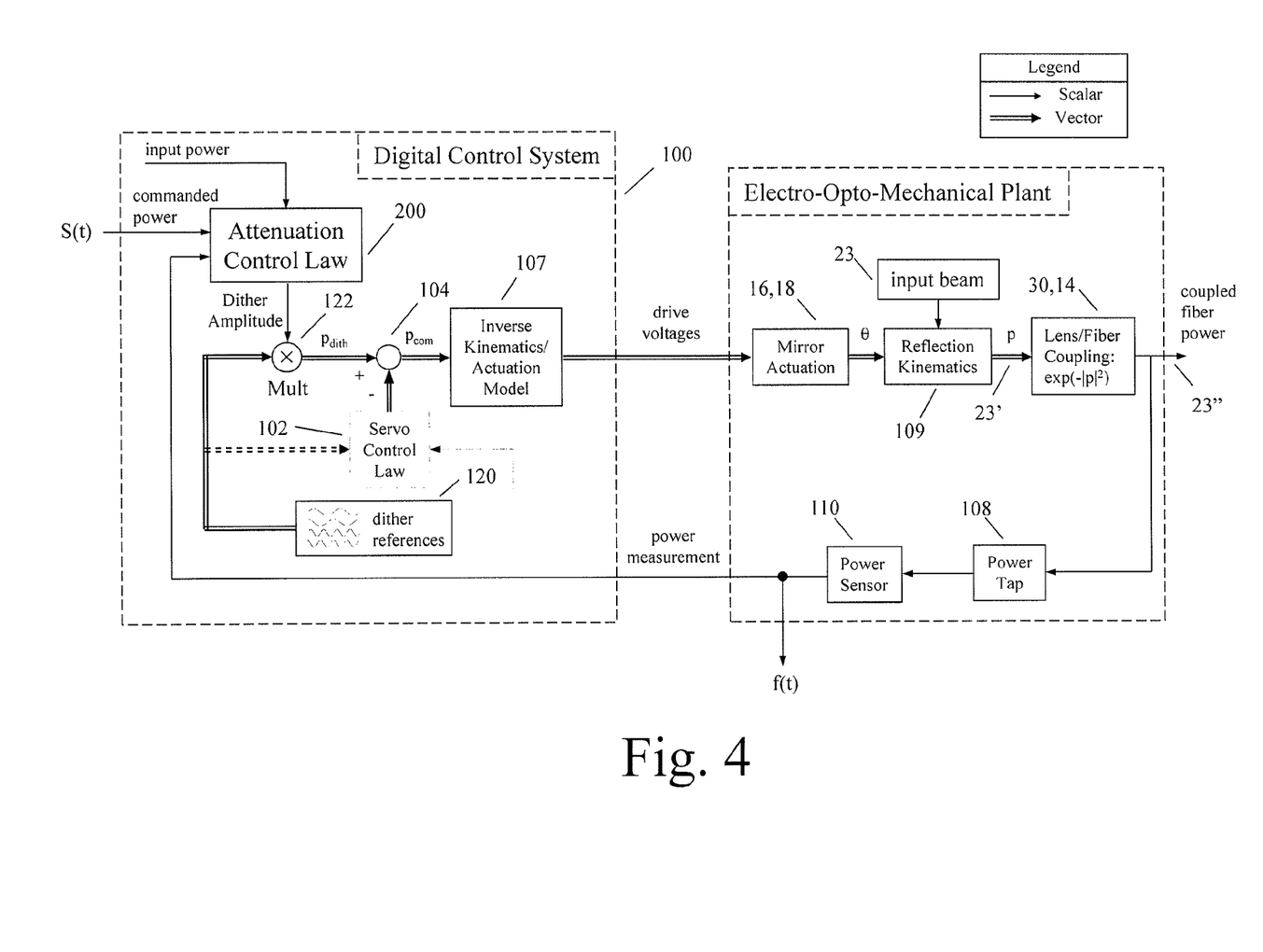
FIG. 4 is a schematic diagram of a control system employing variable optical attenuation according to the invention.

Referring again to FIG. 4, the dither references 120 are provided to the dither-multiplier junction 122 and optionally to the servo control law unit 102. The dither-multiplier junction 122 multiplies the dither references 120 by the dither amplitude generated by the attenuation control law unit 200 to produce a set of dither signals $p_{dith}$. The summer 104 combines the feedback control signals from servo element 102 and the dither signals $p_{dith}$ from multiplier unit 122 to satisfy the commanded value, $p_{com}$, requested by S(t). This scalar value can be expressed and scaled as the desired output optical power value, which primarily affects the dither amplitude either in $(\alpha, \beta)$ or $(\rho, \sigma)$ space or both, dependent of implementation method to use one or two mirrors. The inverse kinematics and actuation model 107 converts the commands $p_{com}$ into actuator drive voltages, which, upon application to the plant, are intended to produce alignment errors that track the commands $p_{com}$.

Figure 5:
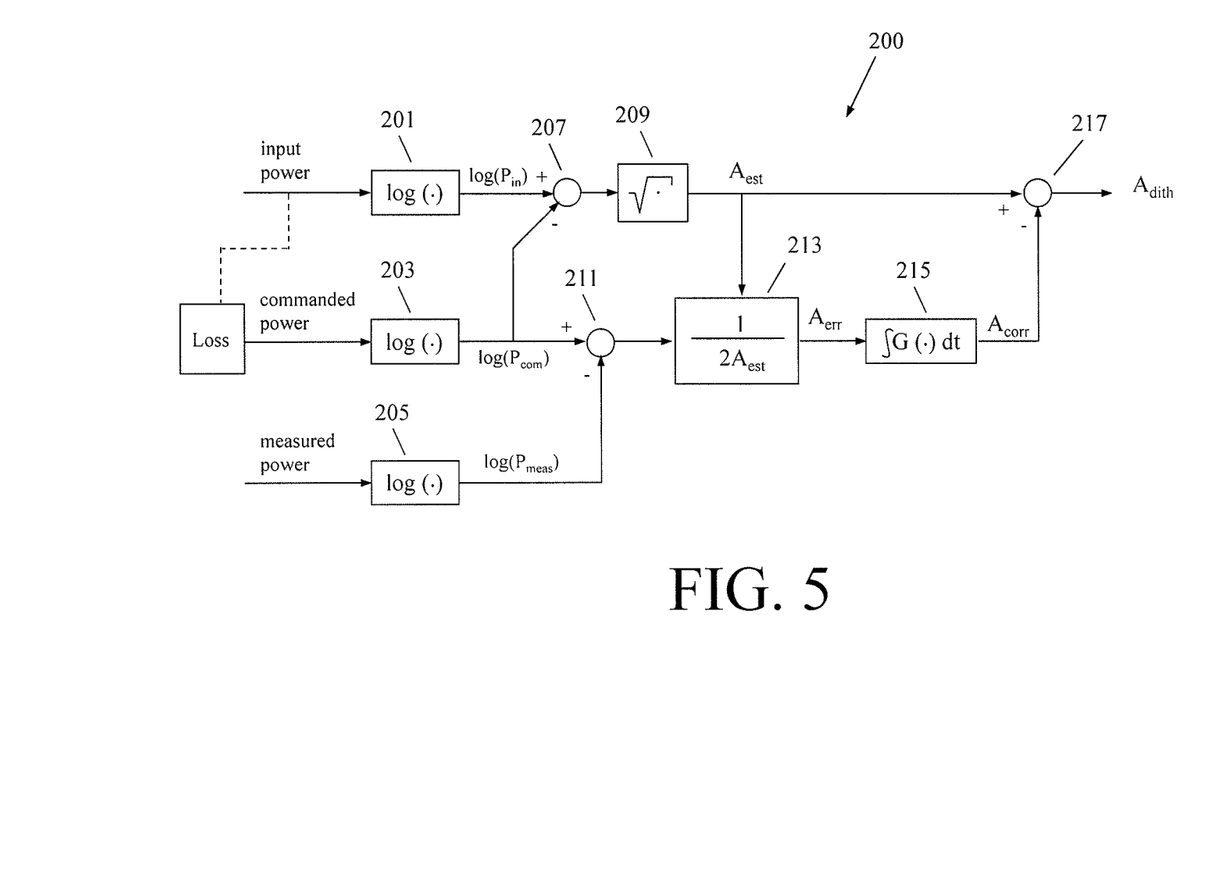
FIG. 5 is a schematic diagram illustrating the attention control law.

FIG. 5 illustrates elements in the attenuation control law unit 200 according to the invention. The commanded value can be defined individually as the requested output power or in relation to the input where L is the relative loss between input and commanded power. In-band signaling can be generated by controlling L dynamically over time. When the input power fluctuated so much, the self reference approach will have better detection accuracy. Log operators 201, 203, and 205 convert the input, commanded, and measured power signals, respectively, into log space. The summer 207 forms the difference between the logarithms of the input and commanded power signals. The square-root function 209 converts the difference of logarithms into an initial estimate $A_{est}$ of the dither amplitude required to produce the commanded output power. The summer 211 forms an error signal between the logarithms of the commanded and measured power signals, which is scaled by the scaling element 213 to form the dither-amplitude error estimate $A_{err}$. The error estimate $A_{err}$ is numerically integrated by integrator block 215 to form the correction term $A_{corr}$. Summer junction 217 forms the difference between the initial estimate $A_{est}$ and the correction term $A_{corr}$ to produce the dither amplitude $A_{dith}$.

Amplitude Modulation Signaling Method

Figure 6A:
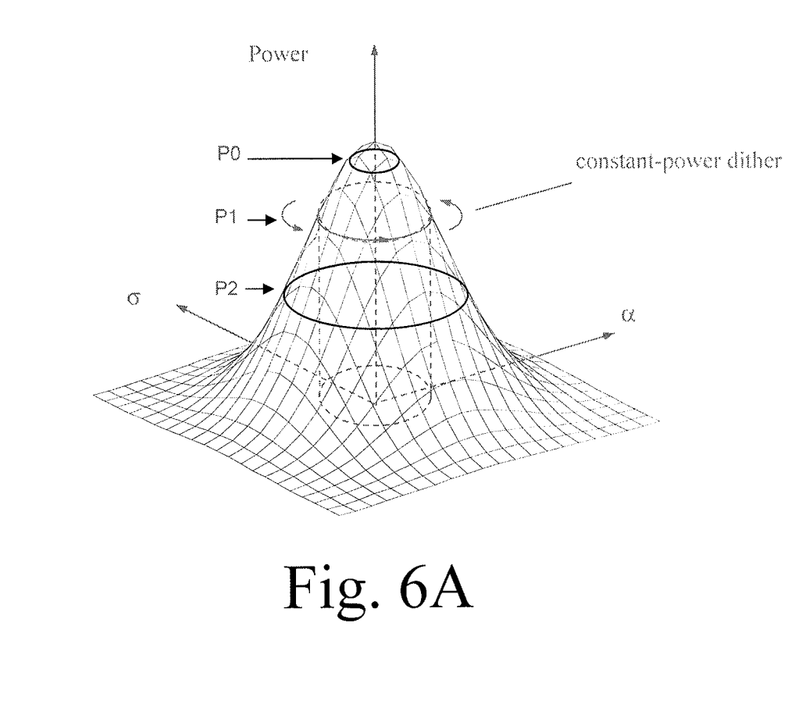
FIG. 6A is a three-dimensional graph illustrating dither at three constant power levels.
Figure 6B:
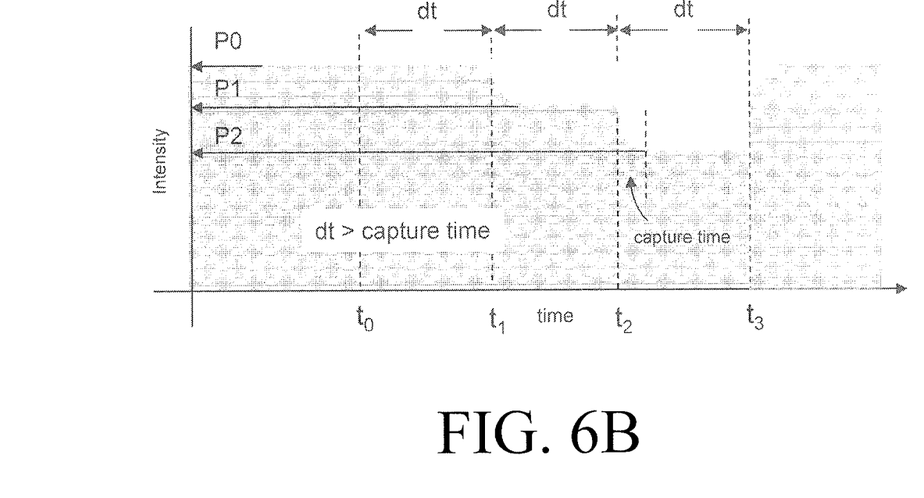
FIG. 6B is a graph of time vs. amplitude illustrating the three constant power levels of FIG. 6A.
Figure 7:
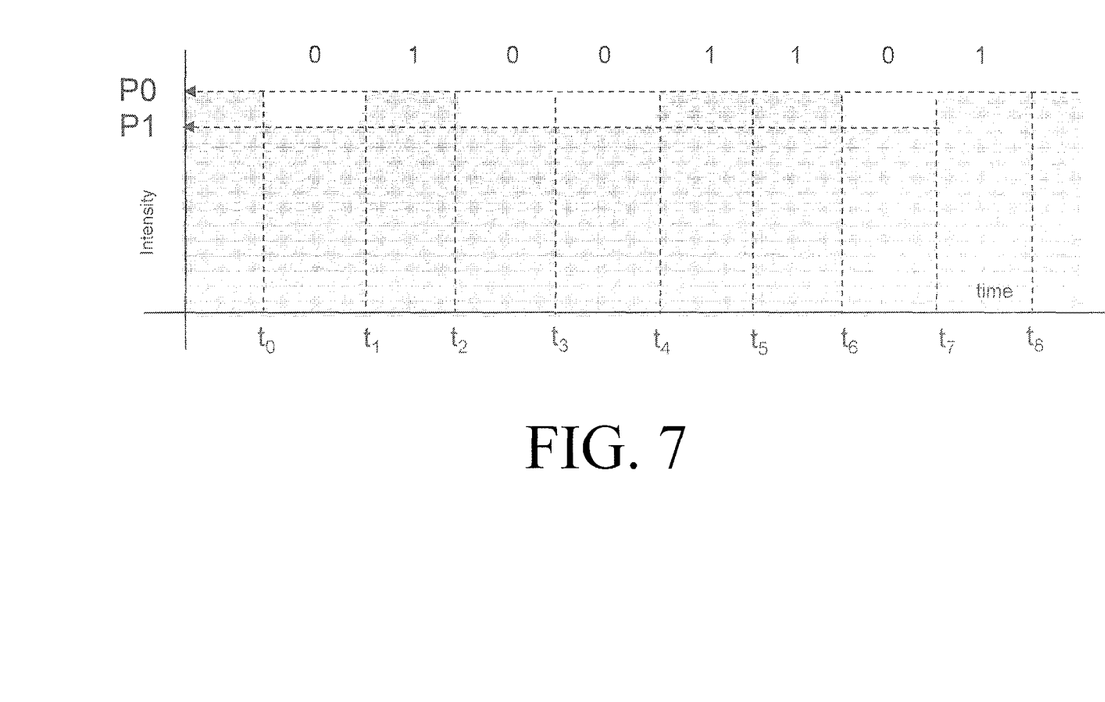
FIG. 7 is a graph of time vs. amplitude illustrating three constant power levels.

According to the feedback control mechanism with elements of a fiber optic switch as discussed previously, the output power can be changed in real time as a sequence of events expressed by different optical power levels. This sequence of events can be used as control signal and this method is primarily based on amplitude modulation. FIG. 6A shows the constant-power dithering at three output levels and FIG. 6B illustrates the "analog" waveform corresponding to the three power levels set with the closed loop control of attenuation of optical power. Information is expressed as a sequence of commanded power levels or power transition (δP) and the direction of change (+/−), i.e., P0−P1 (+δP1), P1−P2 (+δP2), and P2−P0 (−δP3), where P0 is the optimal coupled power measured at the output, P1 and P2 are subsequent attenuated power levels. δP is the power difference between two subsequent levels and its sign refers power increase (+) or decrease (−). Each of these power levels can be attained and stabilized within δt, where δt is larger than the capture time, which is the time required by the closed loop control to settle on the set value. The resolution of each transition step will be limited only by the control precision. For example, if the achievable precision is +/−0.05 dB, then the attenuation range of 1.6 dB can be divided into 16 steps (4-bit) and two-transition is 8-bit equivalent. Another example is shown in FIG. 7 is based on bi-level modulation. "1" and "0" are represented by two power levels or power transition—increase or decrease.

Figure 8:
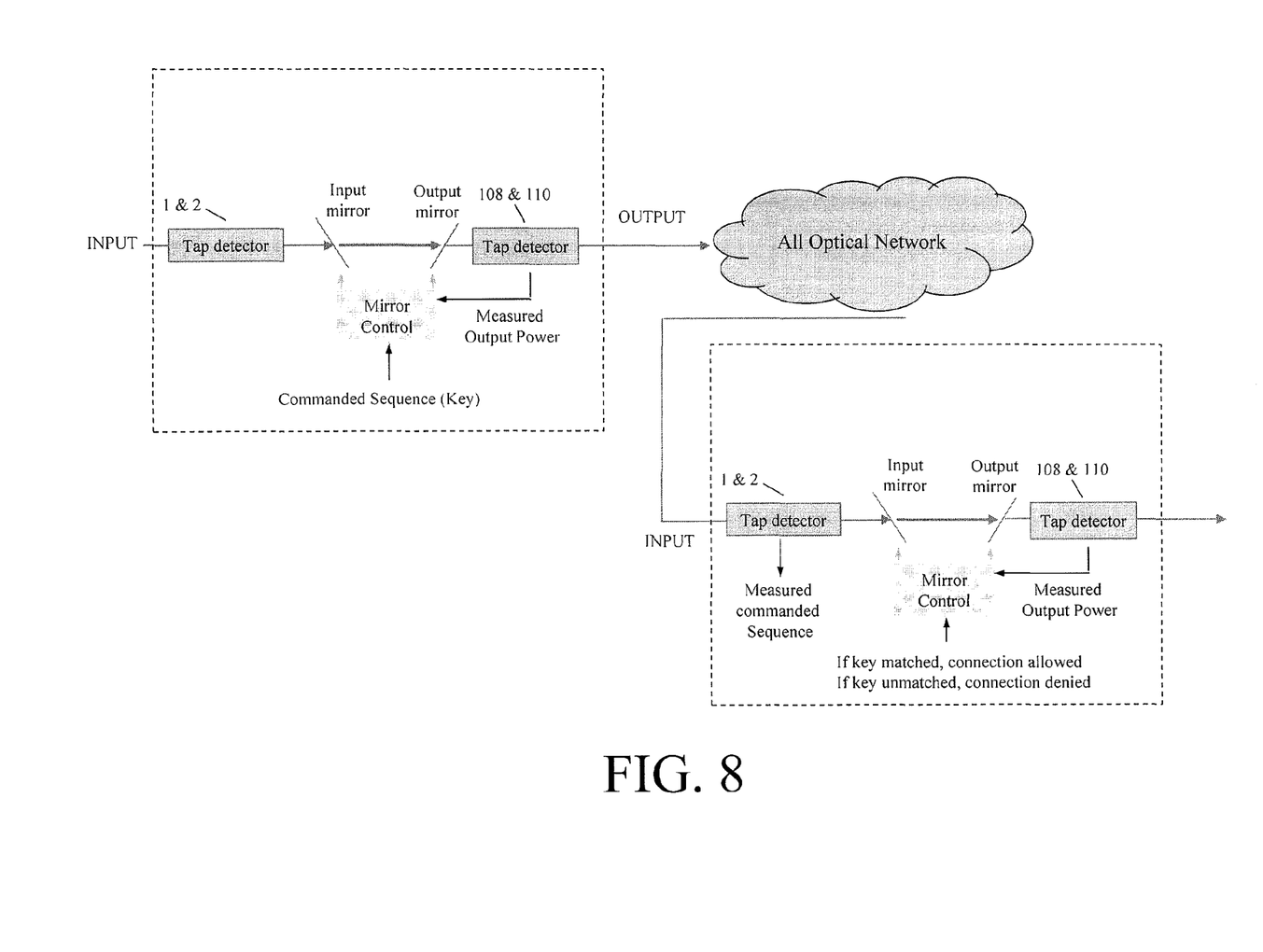
FIG. 8 is a schematic diagram to illustrate an application of optical key using in-band signaling.

One example of application of in-band signaling, as shown in FIG. 8, is to encode optically a key into data channel by the "send" optical switch so the "receive" optical switch can determine if an optical connection should be made for the incoming data. In this example, the key and data will travel together on the same optical channel along an optical path, arriving at the "receive" optical switch. The input fiber of the "receive" optical switch is equipped with a tap photo-detector so it has the ability to detect optically the key. If the key is matched, a connection will be made. If not, connection will be denied.

Novel Features

The novel method of amplitude modulation method as disclosed herein is incorporated into the variable attenuator of FIG. 1 shown in greater detail as the attenuation control law unit 200 from FIG. 5 and uses the amplitude of the control dithers to set the DC level of attenuation for each of the discrete attenuation levels. Thus, the modulation and dither-based servo functions can operate simultaneously or independently.

Alternate Implementations

The invention has been explained with reference to specific embodiments. Other embodiments will be evident to those of skill in the art. For example, the system need not employ dithering as for example in a system employing a DC offset for inducing beam alignment errors to produce the desired attenuation It is therefore not intended that this invention be limited, except as indicated by the appended claims.

What is claimed is:

1. A method comprising:
   generating a continuous in-band information-carrying signal channel on an optical beam by manipulating two tip-tilt mirrors guiding the optical beam while maintaining alignment of the optical beam to a target coupling fiber in such a way as to produce an information-carrying amplitude modulated artifact on the optical beam independent of any information-carrying signal channels embedded in the optical beam.

2. The method of claim 1 comprising:
   employing amplitude of induced mirror angles to modulate the level of the measured output power involving two tip-tilt mirrors to couple optical power from an input fiber to an output fiber, four mirror axes being actuated to produce a time-varying set of induced mirror angles that yield a desired time history of optical power level wherein a sequence of signals expressed as time-varying optical power level are used as in-band signaling along an optical channel common with data carried in the optical channel.

3. The method of claim 1 wherein the amplitude modulated artifact is implemented by:
   modulating amplitude of mirror angles to control the level of the measured output power involving two tip-tilt mirrors that are employed to couple optical power from an input fiber to the target output fiber, four mirror axes being actuated to produce a time-varying set of induced mirror angles that yield a desired variation in amplitude of optical power level wherein a sequence of signals expressed as time-varying optical power level is used as in-band signaling along an optical channel common with data carried in the optical channel.

4. The method of claim 1 wherein the frequency modulated artifact is effected by modulating the optical beam at a varying dithering amplitude along a first axis orthogonal to the optical beam and a second dithering amplitude identical to the first dithering amplitude along a second axis orthogonal to the optical beam while maintaining a constant rate of dithering about the beam path.

5. An apparatus for modulating an optical beam comprising:
   an input element for input of an optical beam having embedded information carrying channels;
   a first tip-tilt mirror in the path of the input optical beam;
   a second tip-tilt mirror in the path of optical beam output from the first tip-tilt mirror;
   a target output optical fiber in the path of optical beam output from the second tip-tilt mirror;
   a controller for manipulating the first tip-tilt mirror and the second tip-tilt mirror for guiding the optical beam while maintaining alignment of the optical beam to a target coupling optical waveguide in such a way as to produce an amplitude modulated artifact on the output of the optical beam independent of any information-carrying signal channels embedded in the optical beam.

6. The apparatus according to claim 5 wherein the amplitude modulated artifact is effected by modulating the optical beam at a varying dithering amplitude along a first axis orthogonal to the optical beam and a second dithering amplitude identical to the first dithering amplitude along a second axis orthogonal to the optical beam while maintaining a constant rate of dithering about the beam path.

* * * * *